United States Patent
Zhu

(10) Patent No.: US 9,042,311 B2
(45) Date of Patent: May 26, 2015

(54) TECHNIQUES FOR EVALUATION AND IMPROVEMENT OF USER EXPERIENCE FOR APPLICATIONS IN MOBILE WIRELESS NETWORKS

(75) Inventor: Jing Zhu, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 745 days.

(21) Appl. No.: 12/903,539

(22) Filed: Oct. 13, 2010

(65) Prior Publication Data

US 2011/0216717 A1 Sep. 8, 2011

Related U.S. Application Data

(60) Provisional application No. 61/311,174, filed on Mar. 5, 2010.

(51) Int. Cl.
| | |
|---|---|
| H04W 4/00 | (2009.01) |
| H04W 28/24 | (2009.01) |
| H04W 28/02 | (2009.01) |
| H04W 72/12 | (2009.01) |

(52) U.S. Cl.
CPC .............. *H04W 28/24* (2013.01); *H04W 28/02* (2013.01); *H04W 72/1242* (2013.01)

(58) Field of Classification Search
CPC .................................................... H04W 72/04
USPC .......... 370/322, 329, 341, 348, 443; 455/345, 455/263, 326, 336, 442, 498
See application file for complete search history.

(56) References Cited

U.S. PATENT DOCUMENTS

| | | | |
|---|---|---|---|
| 2008/0102853 A1 | 5/2008 | Kagimoto et al. | |
| 2009/0040993 A1 | 2/2009 | Kim et al. | |
| 2010/0208588 A1* | 8/2010 | Vinokour et al. | 370/230.1 |
| 2011/0044262 A1* | 2/2011 | Satapathy et al. | 370/329 |

FOREIGN PATENT DOCUMENTS

WO 2009050569 4/2009

OTHER PUBLICATIONS

European Search Report received for European Patent Application No. EP 11 15 4216.3-2414, mailed Jun. 21, 2011, 11 pages.
Office Action received for Korean Patent Application No. 2011-0019610, mailed Oct. 31, 2012, 1 page English translation.

* cited by examiner

*Primary Examiner* — Derrick Ferris
*Assistant Examiner* — Abdelnabi Musa
(74) *Attorney, Agent, or Firm* — Kacvinsky Daisak Bluni PLLC

(57) ABSTRACT

Techniques are described for evaluating and improving a user experience for applications in mobile wireless networks. In some embodiments, for example, traffic characteristic prioritization information may be received from a base station at a mobile station and the traffic characteristic prioritization information may be sent to one or more applications. Traffic characteristic parameters may be received from the one or more applications and a request may be sent from the mobile station to the base station to create a service flow or modify an existing service flow. A prioritization value for the service flow may be received based on the traffic characteristic parameters and the traffic characteristic prioritization information. Other embodiments are described and claimed.

19 Claims, 7 Drawing Sheets

TECHNIQUES FOR EVALUATION AND IMPROVEMENT OF USER EXPERIENCE FOR APPLICATIONS IN MOBILE WIRELESS NETWORKS

CLAIM OF PRIORITY

This Application claims the benefit of U.S. Provisional Application No. 61/311,174, filed Mar. 5, 2010, the entire disclosure of which is herein incorporated by reference.

BACKGROUND

Wireless communication systems communicate information over a shared wireless communication medium such as one or more portions of the radio-frequency (RF) spectrum. Recent innovations in mobile computing devices and the increased availability of advanced, interactive, multimedia and other data services have resulted in increased demands placed on wireless communications systems. Furthermore, the limited bandwidth of wireless communications systems and the cost of transmission of data, among other factors, are important considerations when implementing wireless communications systems. One particular area that results in increased demands on wireless communications systems is different types of applications that require varying amounts of wireless bandwidth. As the number and type of bandwidth intensive applications continues to increase, the demands placed on wireless communications systems and mobile computing devices also increase. Consequently, techniques designed to manage application priority and enhance application usability are desirable.

DETAILED DESCRIPTION

Various embodiments may be generally directed to techniques to improve the quality of user experience for Internet applications and to evaluate the quality of user experience for Internet video applications in a wireless communications system. Some embodiments may be particularly directed to application-agnostic prioritization, downlink buffer reports and time alignment methods for video data files, for example. Other embodiments are described and claimed.

The number and type of bandwidth intensive applications used in modern mobile wireless networks continues to increase. In various embodiments, mobile wireless networks may include a set of service classes that are provided to support different types of applications. For example, as defined in one or more of the IEEE 802.16 standards for WMAN including standards such as 802.16-2004, 802.16.2-2004, 802.16e, 802.16f, 802.16m progeny and variants, there are five service classes that include Unsolicited Grant Service (UGS), Real-time polling service (rtPS), extend rtPS (ertPS), non-real-time polling service (nrtPS), and best effort (BE).

Among these classes, UGS, rtPS, and ertPS are designed to support "Real Time" applications, and may have a higher priority than nrtPS or BE service classes in scheduling and resource allocation. However, in many current mobile wireless networks, there is no standard way to determine what applications should be classified as "Real Time" or to map applications to each of these service classes. In some embodiments, UGS, ertPS, and rtPS may be controlled by a network operator or carrier, and may be activated only for applications that have obtained permission from the operator, which may not always be possible for all kinds of Internet applications. Consequently, a substantial need exists to improve the quality of the user experience for Internet applications that do not obtain permission from the operator to use UGS, ertPS, and nrtPS, and can only be supported with BE.

Figure 1:
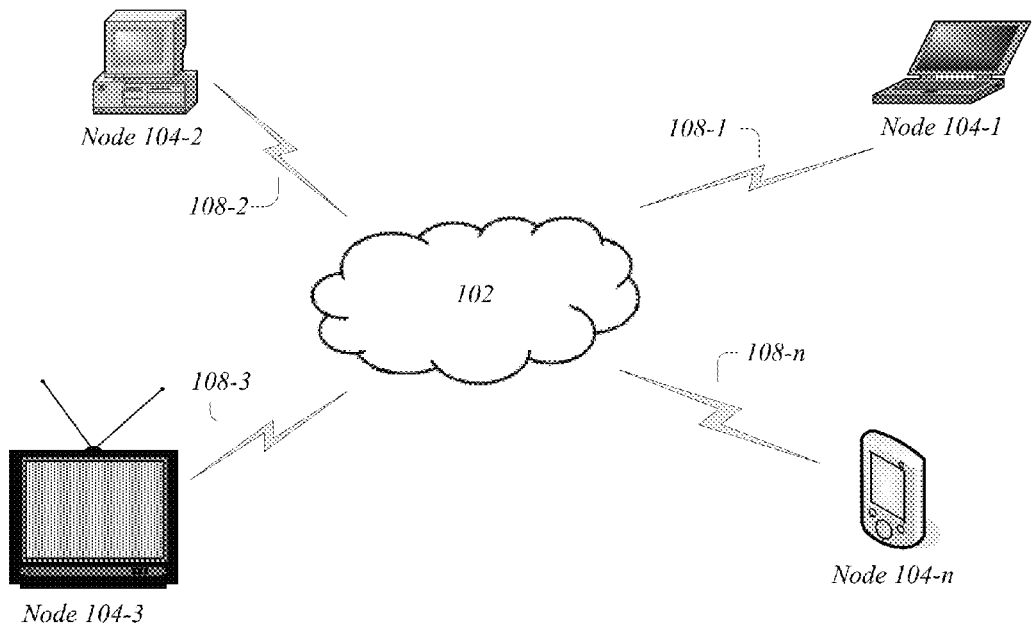
FIG. 1 illustrates one embodiment of a communications system.

FIG. 1 illustrates a block diagram of one embodiment of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, the communications system 100 may comprise, or form part of a wired communications system, a wireless communications system, or a combination of both. For example, the communications system 100 may include one or more nodes arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The communications system 100 also may include one or more nodes arranged to communicate information over one or more types of wireless communication links. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands.

The communications system 100 may communicate information in accordance with one or more standards as promulgated by a standards organization. In one embodiment, for example, various devices comprising part of the communications system 100 may be arranged to operate in accordance with one or more of the IEEE 802.16 standards for WMAN including standards such as 802.16-2004, 802.16.2-2004, 802.16e-2005, 802.16f, 802.16m progeny and variants; WGA (WiGig) progeny and variants or a 3GPP Long-Term Evolution (LTE) standard. In some embodiments, the communications system 100 may be arranged to communicate in accordance with any fourth generation (4 G) network or radio technology progeny and variants.

In various embodiments, the communications system 100 may be arranged to operate in accordance with one or more of the IEEE 802.11 standard, the WiGig Alliance™ specifications, WirelessHD™ specifications, standards or variants, such as the WirelessHD Specification, Revision 1.0d7, Dec. 1, 2007, and its progeny as promulgated by WirelessHD, LLC (collectively referred to as the "WirelessHD Specification"), or with any other wireless standards as promulgated by other standards organizations such as the International Telecommunications Union (ITU), the International Organization for Standardization (ISO), the International Electrotechnical Commission (IEC), the Institute of Electrical and Electronics Engineers (information IEEE), the Internet Engineering Task Force (IETF), and so forth. In various embodiments, for example, the communications system 100 may communicate information according to one or more IEEE 802.11 standards for wireless local area networks (WLANs) such as the information IEEE 802.11 standard (1999 Edition, Information Technology Telecommunications and Information Exchange Between Systems—Local and Metropolitan Area Networks—Specific Requirements, Part 11: WLAN Medium Access Control (MAC) and Physical (PHY) Layer Specifications), its progeny and supplements thereto (e.g., 802.11a, b, g/h, j, n, VHT SG, and variants); IEEE 802.15.3 and variants; European Computer Manufacturers Association (ECMA) TG20 progeny and variants; and other wireless networking standards. The embodiments are not limited in this context.

The communications system 100 may communicate, manage, or process information in accordance with one or more protocols. A protocol may comprise a set of predefined rules or instructions for managing communication among nodes. In various embodiments, for example, the communications system 100 may employ one or more protocols such as a beam forming protocol, medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), a contention-based period (CBP) protocol, a distributed contention-based period (CBP) protocol and so forth. In various embodiments, the communications system 100 also may be arranged to operate in accordance with standards and/or protocols for media processing. The embodiments are not limited in this context.

As shown in FIG. 1, the communications system 100 may comprise a network 102 and a plurality of nodes 104-1-$n$, where n may represent any positive integer value. In various embodiments, the nodes 104-1-$n$ may be implemented as various types of wireless devices. Examples of wireless devices may include, without limitation, a station, a subscriber station, a base station, a wireless access point (AP), a wireless client device, a wireless station (STA), a laptop computer, ultra-laptop computer, portable computer, personal computer (PC), notebook PC, handheld computer, personal digital assistant (PDA), cellular telephone, combination cellular telephone/PDA, smartphone, pager, messaging device, media player, digital music player, set-top box (STB), appliance, workstation, user terminal, mobile unit, consumer electronics, television, digital television, high-definition television, television receiver, high-definition television receiver, and so forth.

In some embodiments, the nodes 104-1-$n$ may comprise one more wireless interfaces and/or components for wireless communication such as one or more transmitters, receivers, transceivers, radios, chipsets, amplifiers, filters, control logic, network interface cards (NICs), antennas, antenna arrays, modules and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth.

In various embodiments, the nodes 104-1-$n$ may comprise or form part of a wireless network 102. In one embodiment, for example, the wireless network 102 may comprise a Worldwide Interoperability for Microwave Access (WiMAX) network. Although some embodiments may be described with the wireless network 102 implemented as a WiMAX wireless network for purposes of illustration, and not limitation, it can be appreciated that the embodiments are not limited in this context. For example, the wireless network 102 may comprise or be implemented as various types of wireless networks and associated protocols suitable for a Wireless Personal Area Network (WPAN), a Wireless Local Area Network (WLAN), a Wireless Metropolitan Area Network, a Wireless Wide Area Network (WWAN), a Broadband Wireless Access (BWA) network, a radio network, a cellular network, a television network, a satellite network such as a direct broadcast satellite (DBS) network, and/or any other wireless communications network configured to operate in accordance with the described embodiments. Other embodiments are described and claimed.

Figure 2A:
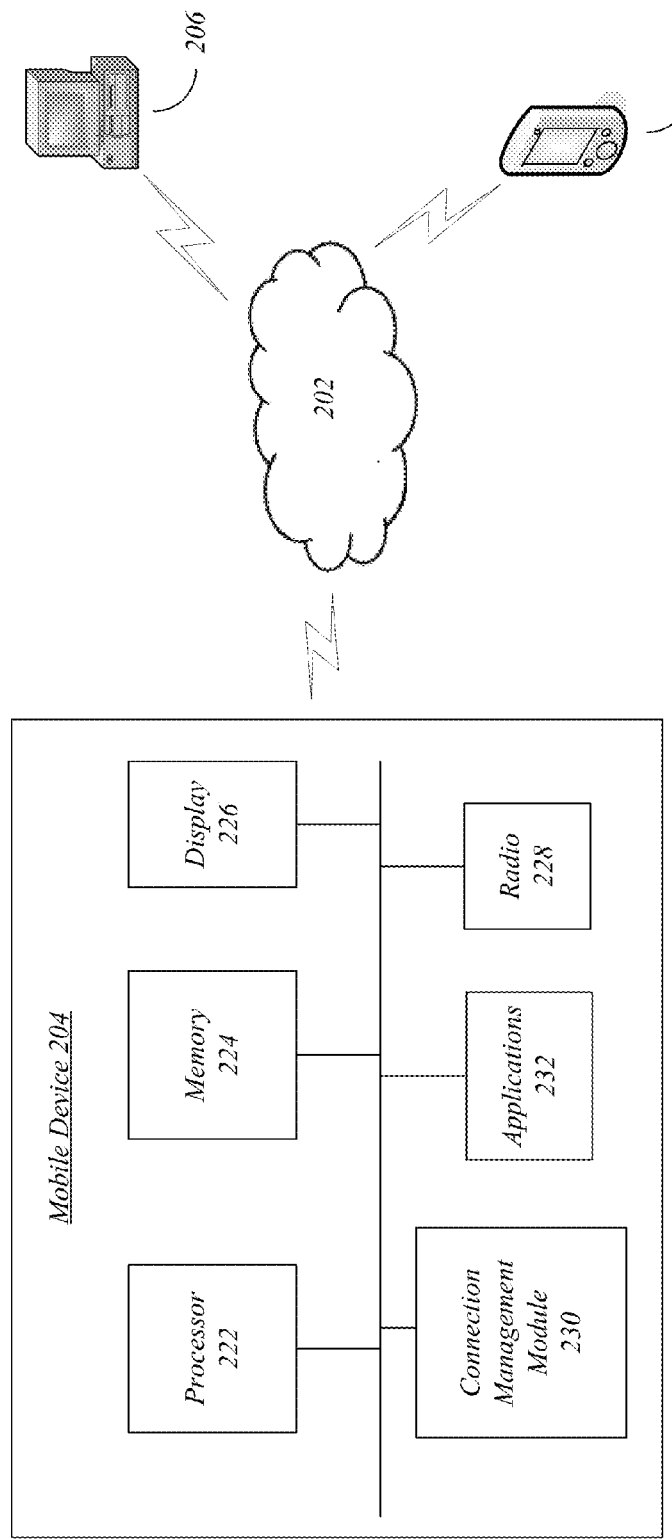
FIG. 2A illustrates one embodiment of a first apparatus.

FIG. 2A illustrates a first apparatus 200. As shown in FIG. 2A, the first apparatus 200, which may comprise a wireless communications system similar to that described with reference to FIG. 1, may include nodes 204, 206 and 208 and wireless network 202. Wireless network 202 may comprise the same or a similar network to wireless network 102 described in FIG. 1. Nodes 204, 206 and 208 may comprise mobile computing device similar to nodes 104-1-$n$ described in FIG. 1. As shown in FIG. 2A, mobile computing device 204 has been expanded to show additional details of the device. It should be understood that any suitable device may contain the same or similar functionality and still fall within the described embodiments. Furthermore, while a limited number of mobile computing devices, wireless networks and modules are shown in FIG. 2A for purpose of illustration, it should be understood that the embodiments are not limited to the number or type of elements or modules shown in FIG. 2A. Other embodiments are described and claimed.

In various embodiments, mobile computing device 204 may include a processor 222, a memory 224, a display 226, one or more radios or transceivers 228, a connection management module 230 and applications 232. Mobile computing device 204 may be in wireless communication with one or more of mobile computing devices 206 and/or 208 using wireless network 202. For purposes of illustration, system 200 will be described hereinafter as a WiMAX system where mobile computing device 204 comprises a subscriber or user mobile computing device and devices 206 and 208 comprise base stations or other network devices operative to exchange information with or provide information to mobile computing device 204. The embodiments are not limited in this context.

As shown, mobile computing device 204 may comprise a processor 222. The processor 222 may be implemented as any processor, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processor 222 may be implemented as a general purpose processor, such as a processor made by Intel® Corporation, Santa Clara, Calif. The processor 222 may also be implemented as a dedicated processor, such as a controller, microcontroller, embedded processor, a digital signal processor (DSP), a network processor, a media processor, an input/output (I/O) processor, and so forth. The processor 222 may have any number of processor cores, including one, two, four, eight or any other suitable number. The embodiments are not limited in this context.

The mobile computing device 204 may comprise a memory 224 in some embodiments. The memory 224 may comprise any machine-readable or computer-readable media capable of storing data, including both volatile and non-volatile memory. For example, the memory 224 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of the memory 224 may be included on the same integrated circuit as the processor 222, or alternatively some portion or all of the memory 224 may be disposed on an integrated circuit or other medium, for example a hard disk drive, that is external to the integrated circuit of the processor 222. The embodiments are not limited in this context.

As further shown in FIG. 2, the mobile devices 204 may comprise a display 226. Display 226 may comprise any suitable display unit for displaying information appropriate for a mobile computing device. In addition, display 226 may be implemented as an additional I/O device, such as a touch screen, touch panel, touch screen panel, and so forth. Touch screens may comprise display overlays which are implemented using one of several different techniques, such as pressure-sensitive (resistive) techniques, electrically-sensitive (capacitive) techniques, acoustically-sensitive (surface acoustic wave) techniques, photo-sensitive (infra-red) techniques, and so forth. The effect of such overlays may allow a display to be used as an input device, to remove or enhance the keyboard and/or the mouse as the primary input device for interacting with content provided on display 226.

In one embodiment, for example, display 226 may be implemented by a liquid crystal display (LCD) or other type of suitable visual interface. Display 226 may comprise, for example, a touch-sensitive color display screen. In various implementations, the display 226 may comprise one or more thin-film transistors (TFT) LCD including embedded transistors. In such implementations, the display 226 may comprise a transistor for each pixel to implement an active matrix. While the embodiments are not limited in this context, an active matrix display may be desirable since it requires lower current to trigger pixel illumination and is more responsive to change than a passive matrix.

In various embodiments, mobile computing device 204 may communicate information over a wireless shared media or network 202 via radio 228. The wireless shared media or network 202 may comprise one or more allocations of RF spectrum. The allocations of RF spectrum may be contiguous or non-contiguous. In some embodiments, the radio 228 may communicate information over the wireless shared media or network 202 using various multicarrier techniques utilized by, for example, WiMAX or WiMAX II systems. For example, the radio 228 may utilize various MU-MIMO techniques to perform beamforming, spatial diversity or frequency diversity.

In general operation, the radio 228 may communicate information using one or more communications channels. The radio 228 may comprise any suitable wireless radio or transceiver operative to communicate in accordance with any number of wireless communication protocols, wireless carrier signals and/or frequencies. A communication channel may be a defined set of frequencies, time slots, codes, or combinations thereof. In one embodiment, for example, the transmitting or receiving portion of the radio 228 of mobile computing device 204 may communicate media and control information to or from the receiving or transmitting portion of a radio of mobile computing devices 206 and/or 208. In some embodiments, the communications channels may use the same or different sets of transmit and/or receive frequencies, depending upon a given implementation. For example, radio 228 may be configured to send/receive information using a plurality of protocols from any number of wireless standards. In some embodiments, radio 228 may be configured to send/receive information or data in accordance with a 802.16m protocol and a 802.16e protocol, for example.

In some embodiments, mobile computing device 104 may include connection management module 230. Connection management module 230 may be operative to receive traffic characteristic prioritization information from a base station 206, send the traffic characteristic prioritization information to one or more applications 232, receive traffic characteristic parameters from the one or more applications 232, send a request to the base station 226 to create a service flow or modify an existing service flow, and receive a prioritization value for the service flow based on the traffic characteristic parameters and the traffic characteristic prioritization information. Other embodiments are described and claimed.

Figure 2B:
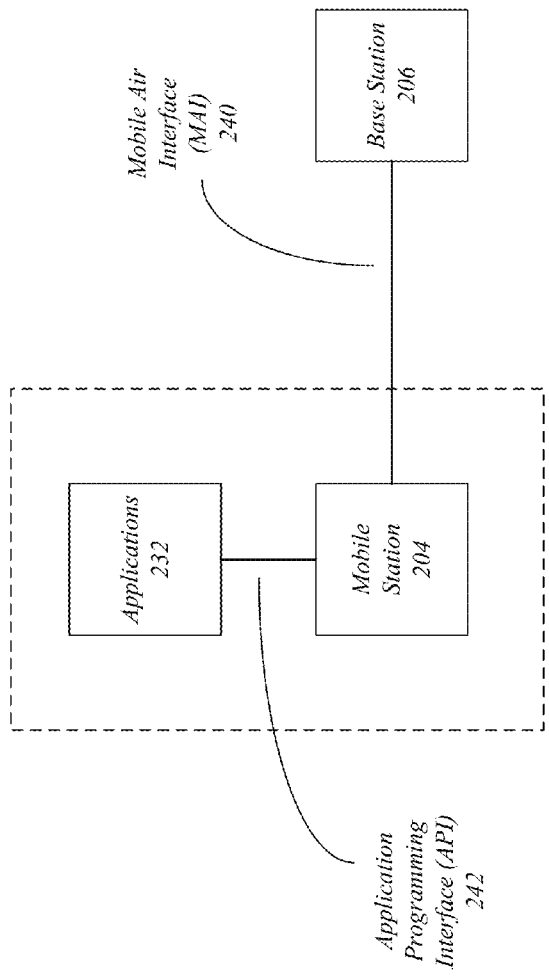
FIG. 2B illustrates one embodiment of a second apparatus.

FIG. 2B illustrates a second apparatus 250. As shown in FIG. 2B, the second apparatus 250, which may comprise a wireless communications system similar to that described with reference to FIG. 1 and FIG. 2A, may include mobile station 204, base station 206 and applications 232. Mobile station 204 and base station 206 may comprise mobile computing devices similar to nodes 104-1-$n$ described in FIG. 1 and devices 204, 206 and 208 described in FIG. 2A. As shown in FIG. 2B, mobile station 204 has been simplified to show fewer components. It should be understood that each of the stations 204, 206 of FIG. 2B may comprise suitable device containing the same or similar functionality to the devices described in FIG. 1 and FIG. 2A and still fall within the described embodiments. Furthermore, while a limited number of mobile computing devices, modules and/or components are shown in FIG. 2B for purpose of illustration, it should be understood that the embodiments are not limited to the number or type of elements or modules shown in FIG. 2B. Other embodiments are described and claimed.

In various embodiments, mobile station 204 may include connection management logic or a connection management module 230 as shown in FIG. 2A. In some embodiments, the connection management logic may be operative to Implement an Application-Agnostic Prioritization (AAP) method. The AAP method may define a method to prioritize a traffic flow based on Traffic Characteristics (TC) parameters, such as Maximum Traffic Burst, Maximum Sustained Traffic Rate, Delay or any other suitable parameter that is universally defined for all applications. For example, the AAP method may be analogous to a "Fast Lane" concept widely used in shopping malls and Supermarkets, where customers with items within a limit can go to designated lanes for fast check out.

As shown in FIG. 2B, applications 232 and mobile station 204 may be collocated on the same mobile device. In some embodiments, the signaling between the applications 232 and the mobile device 204 may implemented using an application programming interface (API). In various embodiments, mobile station 204 and base station 206 may comprise separate and distinct mobile devices. In some embodiments, the signaling between the mobile station 204 and the base station 206 may be implemented using a mobile air interface (MAI). Other embodiments are described and claimed.

Applications 232 may comprise any suitable application, instructions or data set suitable for use with a mobile computing device, such as mobile station 204. For example, applications 232 may comprise one or more applications such as telephony, text messaging, e-mail, web browsing, word processing, video signal display, and so forth. Any number or type of suitable application could be used and still fall within the described embodiments.

In various embodiments, base station 206 may be operative to periodically (every 100 seconds, for example) send a traffic priority broadcast message (TPM message) to all mobile stations that are connected to the base station 206. In some embodiments, this traffic priority message may carry two type of information: best effort (BE) priority and limits of traffic characteristic parameters to enable mobile stations to know what priority level will be assigned to BE service flows. Table 1 below illustrates an example of TPM message.

TABLE 1

| Best Effort Priority (BEP) | Limits of TC Parameters | |
|---|---|---|
| | Maximum Traffic Burst | Maximum Sustained Traffic Rate |
| 2 (High) | 200 bytes | 10 kBps |
| 1 (Medium) | Unlimited | 100 kBps |
| 0 (Low) | Unlimited | Unlimited |

As shown in Table 1, if a service flow has maximum traffic burst of 200 bytes and maximum sustained traffic rate of 10 kBps, its BEP value will be set to 2 (High). On the other hand, if a service flow has both traffic characteristic parameters set to "Unlimited," its BEP value will be set to 0 (Low). Other embodiments are described and claimed.

In various embodiments, for example, the connection management logic of mobile station 204 may be operation to receive the traffic characteristic prioritization information from base station 206. For example, the traffic characteristic prioritization information may comprise a ranking or prioritization of different types of wireless data including one or more of voice data, video data or file transfer data. In some embodiments, the voice data is assigned a high priority, the video data is assigned a medium priority and the file transfer data is assigned a low priority. While a limited number and type of wireless data and priorities are described for purpose of illustration, it should be understood that any number or type of data or priority could be used and still fall within the described embodiments.

Mobile station 204 may be operative to send the latest TPM information including BEP and limits of TC parameters to applications 232 via API 242 so that applications 232 can configure their TC parameters accordingly in some embodiments. For example, connection management logic of mobile station 204 may send the traffic characteristic prioritization information to the one or more applications 232 in various embodiments. This may enable, in some embodiments, the applications 232 to determine what types of traffic will receive priority when transmitted and to tailor their outputs accordingly.

In response, the applications 232 may send information about their traffic characteristics parameters to mobile station 204 via API 242. In embodiments, for example, connection management logic of mobile station 204 may be operative to receive traffic characteristic parameters from the one or more applications 232. In various embodiments, mobile station 204 may send a request to the base station 206 to create a service flow or modify an existing service flow after receiving the traffic characteristic parameters from the one or more applications 232. For example, mobile station 204 may send a request to base station 206 for creating a new BE service flow or modifying an existing BE service flow. In the request, in some embodiments, the mobile station 204 may specify the TC parameters of the service flow. In response, the base station 206 will assign the appropriate BEP value to the service flow.

In some embodiments, the base station 206 may be operative to schedule the BE service flows according to their BEP value. For example, a service flow with higher BEP value will be given higher priority in scheduling and resource allocation. It is worth noting that the BEP may only be meaningful when BE service flows compete with each other, and may not impact the scheduling decision when BE service flows compete with other type of service flows.

In various embodiments, mobile station 204 may receive a prioritization value for the service flow based on the traffic characteristic parameters and the traffic characteristic prioritization information from the base station 206. The connection management logic of the mobile station 204 may also be operative to receive scheduling information for the service flow from the base station 206 and transmit the service flow based on the scheduling information in some embodiments. For example, the base station 204 or connection management logic may be operative to determine, based on the information received from the applications 232 and the information received from the base station 206, when the optimal time is to transmit a service to ensure that the service flow obtains a desired priority level.

In various embodiments, an additional or complementary method to the above-described application-agnostic prioritization method may be used to further support or enhance real time applications with a BE service class. In some embodiments, the additional or complementary method may comprise a downlink buffer report (DBR). For example, if all applications comprise a high priority, it may be difficult to prioritize each application because each application may have the same traffic characteristics. In this example, implementation of a downlink buffer report may enable a mobile station 204 to information one or more applications 232 to reduce their rate if the mobile station 204 is notified of wireless bandwidth congestion by the base station 206. Other embodiments are described and claimed.

In some embodiments, the mobile station 204 may indicates to the base station 206 that it wants to enable DBR in requesting to create a new BE service flow or when modifying an existing BE service flow. For example, the connection management logic of mobile station 204 may be operative to send a request to the base station 206 to enable a downlink buffer report. In response, in various embodiments, the base station 206 may notify the mobile station 204 as to whether DBR is enabled for the service flow. For example, the mobile station 204 may receive a notification message from the base station 206 indicating that the downlink buffer report is enabled.

In various embodiments, if DBR is enabled, the base station 206 may send a DBR MAC signaling header or other type of notification to the mobile station 204 when congestion occurs over the downlink and when congestion is over or is no longer occurring. In some embodiments, after receiving the DBR MAC signaling header, the mobile station 204 may notify the applications 232 via API about whether there is congestion over the downlink and the application may use this information in determining how to proceed. Other embodiments are described and claimed.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

Figure 3:
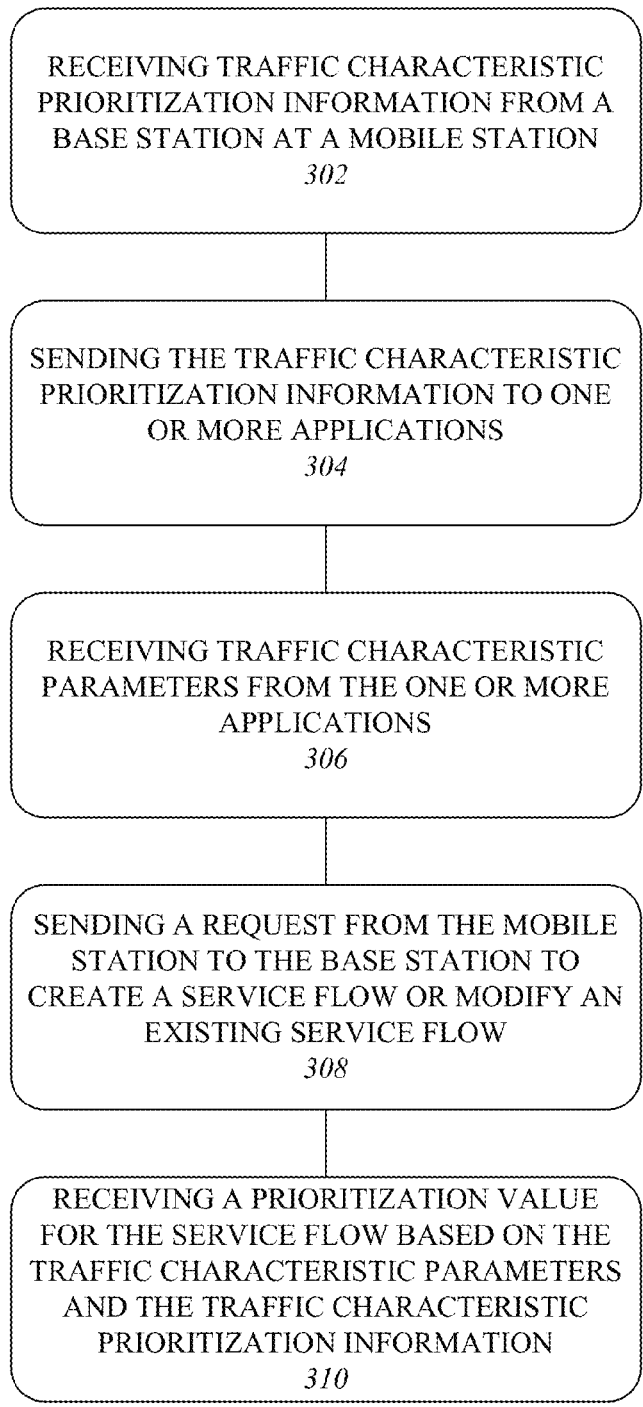
FIG. 3 illustrates one embodiment of a logic flow.

FIG. 3 illustrates one embodiment of a logic flow 300 for improving the quality of user experience for applications in a mobile wireless network. In various embodiments, the logic flow 300 may be performed by various systems, nodes, and/or modules and may be implemented as hardware, software, and/or any combination thereof, as desired for a given set of design parameters or performance constraints. For example, the logic flow 300 may be implemented by a logic device (e.g., node, STA, wireless device) and/or logic comprising instructions, data, and/or code to be executed by a logic device. For purposes of illustration, and not limitation, the logic flow 300 is described with reference to FIGS. 1, 2A and 2B. The embodiments are not limited in this context.

In various embodiments, traffic characteristic prioritization information, comprising a ranking or prioritization of different types of wireless data, may be received from a base station at a mobile station at 302. For example, mobile station 204 may receive TC prioritization information from base station 206 in some embodiments. In various embodiments, the different types of wireless data include one or more of voice data, video data or file transfer data wherein voice data is assigned a high priority, video data is assigned a medium priority and file transfer data is assigned a low priority. Other embodiments are described and claimed.

At 304, the traffic characteristic prioritization information may be sent to one or more applications. For example, mobile station 204 may send the TC prioritization information to applications 232 using API 242. In some embodiments, at 306, traffic characteristic parameters may be received from the one or more applications. For example, mobile station 204 may receive the traffic characteristic parameters, comprising one or more of a maximum traffic burst, a maximum sustained traffic rate or a delay, from applications 232.

At 308, in various embodiments, a request may be sent from the mobile station to the base station to create a service flow or modify an existing service flow. For example, mobile station 204 may send a request to base station 206 to create a BE service flow. In some embodiments, at 310, a prioritization value for the service flow based on the traffic characteristic parameters and the traffic characteristic prioritization information may be received. For example, base station may 206 may provide mobile station 204 with a prioritization value for the BE service flow.

In various embodiments, scheduling information for the service flow may be received from the base station. For example, in addition to the prioritization value, base station 206 may also or alternatively provide mobile station 204 with scheduling information for the service flow. The service flow may be scheduled based on the scheduling information in some embodiments. For example, mobile station 204 and applications 232 may use the scheduling information and/or prioritization value to schedule the service flow for transmission or delivery.

A request may be sent from the mobile station to the base station to enable a downlink buffer report in some embodiments. For example, mobile station 204 may send a request to base station 204 to enable DBR. In various embodiments, a notification may be received from the base station that the downlink buffer report is enabled. For example, in response to the request, base station 206 may notify mobile station 204 that DBR is enabled.

Congestion information may be received from the base station in some embodiments. For example, if the base station 206 detects or otherwise becomes aware of congestion on the wireless network, base station 206 may notify mobile station 204 of the congestion. In various embodiments, the congestion information may be sent to the one or more applications. For example, mobile station 204 may inform applications 232 of the congestions, and the applications 232 may be configured or operative to make appropriate adjustments to avoid or other handle the congestion. Other embodiments are described and claimed.

Another potential shortcoming in modern mobile wireless networks relates to the transmission and presentation of video data or use of video applications. Internet video applications are becoming more and more important in mobile wireless networks as network bandwidth continues to increase. In some embodiments, however, it may be difficult to evaluate the quality of user experience for a large number of Internet video applications, particularly real-time applications, because they may follow a closed source and proprietary design that uses strong encryption mechanisms.

In various embodiments, a key step for video quality assessment is time alignment, in which each reference video frame is mapped to a best matched frame in the recorded video sequence so that a frame-by-frame full reference based video quality assessment tool can be used to measure the quality of user experience of the recorded video sequence. This process may be extremely processor and time intensive and may not provide the needed accuracy or results. Therefore, a need exists for a time alignment method using a cross-correlation function with causality constraint, and a bidirectional matching method to find a start offset to evaluate and improve Internet video applications in mobile wireless networks.

For purposes of clarity, several definitions are used throughout. A reference video may comprise a video sequence that is played out at a transmitter in some embodiments. In various embodiments, recorded video may comprise a video sequence that is transmitted over a network and recorded at receiver. Matched video may comprise a video sequence that consists of the recorded video frames that match the corresponding reference video frames in some embodiments. Other embodiments are described and claimed.

In various embodiments, an algorithm may be implemented to improve the alignment of video data in a mobile wireless network. In some embodiments, the algorithm or other logic may be implemented at any suitable device in the mobile wireless network, such as mobile device 204 of FIG. 2A or base station 206, for example. In various embodiments, the inputs of the algorithm may comprise the reference video and the recorded video, and the output of the algorithm may comprise the matched video.

A frame-by-frame video quality assessment tool, such as Q-Master, for example, may be used to obtain a quality of user experience measurement, such as a mean opinion score, for the recorded video sequence. For purposes of clarity, several parameters are used throughout the following equations to explain the video timing algorithm. The parameters comprise, in various embodiments:

K—maximum tolerable delay (frames)
S—start offset (frames)
R—reference video frame rate
R—recorded video frame rate
F—effective frame rate
P—frame loss rate
$x^{(s)}$—the s-th reference video frame wherein s is from 1 to M, where M is the total number of frames in the reference video
$y^{(n)}$—the n-th recorded video frame wherein n is from 1 to N, where N is the total number of frames in the recorded video
$z^{(s)}$—the index of the recorded video frame that matches the s-th reference video frame.

In various embodiments, the reference video may be played at the transmit device, and then the recorded video may be received at the receive device with a video recording tool, such as SuperTinTin, for example. In some embodiments, a transmit or receive device may comprise a handheld, laptop, desktop, or other suitable computing device as described herein. For purposes of clarity and not limitation, it may be assumed that the same frame rate exists for the reference video and for the recorded video, for example R=r. The embodiments are not limited in this context.

In various embodiments, a cross correlation method may be used to obtain the matched video frames. In some embodiments, the cross correlation function may comprise:

$$z^{(s)} = \arg\max_n (f(x^{(s)}, y^{(n)}))$$

In some embodiments, $f(\cdot)$ may comprise the normalized cross correlation function of the two video frames and may be computed according to the following function:

$$f(a, b) = \frac{\sum_{j=1}^{A} \sum_{i=1}^{B} a_{ij} b_{ij}}{\sqrt{\left(\sum_{j=1}^{A} \sum_{i=1}^{B} a_{ij}^2\right)\left(\sum_{j=1}^{A} \sum_{i=1}^{B} b_{ij}^2\right)}}$$

In the preceding function, $a_{ij}$ may comprise the luma or brightness component of an (i, j) pixel of a frame a. In some embodiments, the resolution of reference video, recorded video and matched video may be the same or substantially similar.

In various embodiments, a search for the first matched video frame, e.g., s=1, in the following recorded video frames:

$$n \in [1, N-(M+K-1)]$$

The last recorded video frames may be excluded to ensure there are enough frames for the remaining M−1 reference video frames in some embodiments, considering the causality constraint that the matched video frames cannot go backwards in time. In various embodiments, the best matched reference video frame for the just found first matched video frame, e.g. bidirectional matched, and a start offset can be calculated according to the following function:

$$S = \arg\max_m (f(y^{(z^{(1)})}, x^{(m)})) - 1$$

In some embodiments, the physical meaning of start offset (S) may be that the reference video frames in front of the (S+1)th reference video frame are lost during the transmission. Therefore, it may be assumed as the best match for the first S reference video frames according the following function:

$$z^{(s)} = z^{(1)} (1 \leq s \leq S+1)$$

If s>S+1, a search for the matched video frame from the previously found frame to the last frame that does not exceed the maximum tolerable delay may be performed according to the following function:

$$n \in [z^{(s-1)}, s-S+K]$$

In various embodiments, K=30. In some embodiments, if the frame rate is 30 fps, the maximum tolerable delay may be 1 second with K=30. After obtaining all of the matched video frames, a frame loss rate and effective frame rate may be calculated as follows and by counting the frames that are different from their previous one:

$$P = \frac{1}{N} \sum_{s=1}^{N} (1 - \text{sgn}(z^{(s)} - z^{(s-1)})))$$

$$F = R(1 - P)$$

Figure 4:
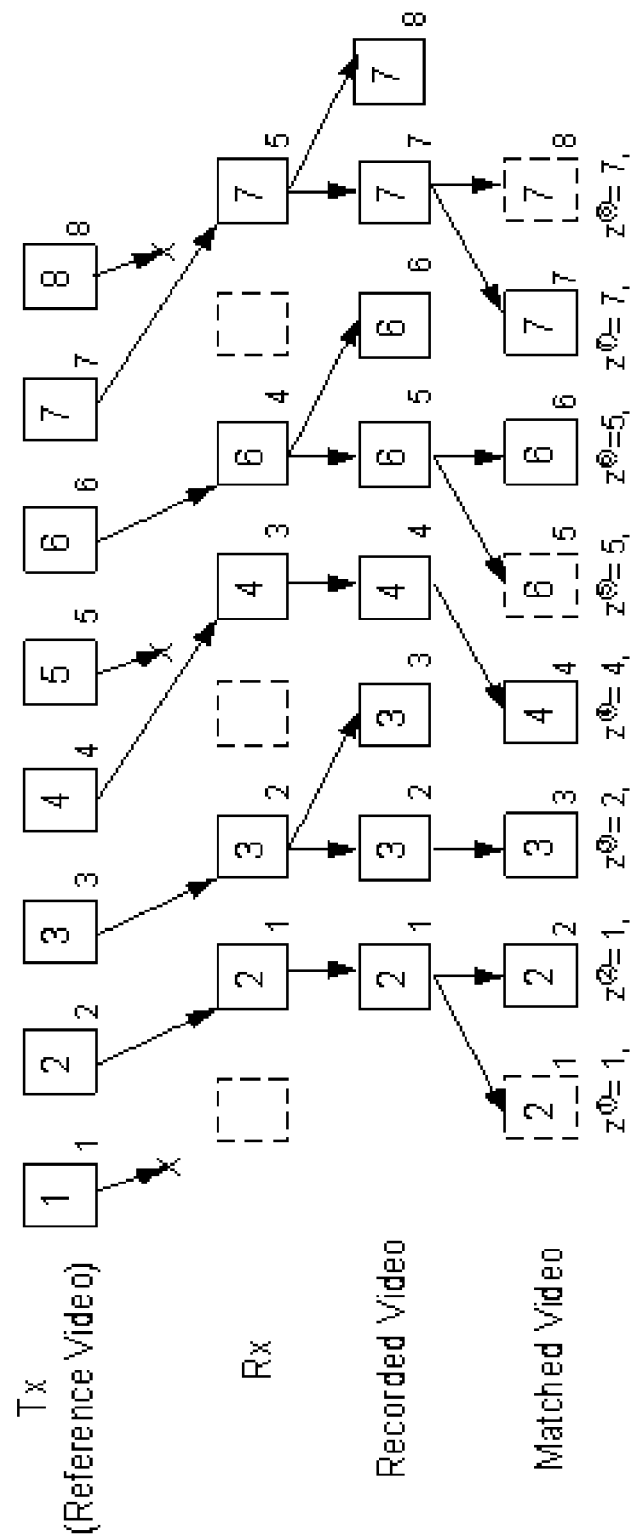
FIG. 4 illustrations one embodiment of a timing diagram

In various embodiments, FIG. 4 illustrates an example to illustrate the foregoing time alignment algorithm. The number in the box may represent the frame index of a frame in reference video, and the number at the corner may indicate the frame index of the frame in the current video sequence in some embodiments. In various embodiments, it may be assumed that frames #1, #5, and #8 of reference video are lost during transmission, and frames #4 and #7 are delayed. In recorded video, the previously received frame may be repeated if the current frame is lost or delayed, and the matched video frames may be realigned with the reference video frames. For example, in FIG. 4 it may be assumed that frames #2, #6, and #7 are the best match for frames #1, #5, and #8, respectively. Accordingly, time alignment of the video sequences can be achieved. Other embodiments are described and claimed.

Figure 5:
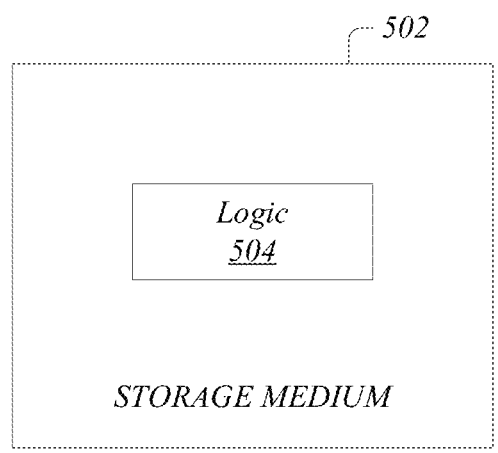
FIG. 5 illustrates one embodiment of an article of manufacture.

FIG. 5 illustrates one embodiment of an article of manufacture 500. As shown, the article 500 may comprise a storage medium 502 to store logic 504 for implementing any of the foregoing methods in some embodiments. For example, logic 504 may be used to implement a connection management module for a mobile computing device, node or other system, as well as other aspects of nodes 104-1-n, for example. In various embodiments, the article 500 may be implemented by various systems, nodes, and/or modules.

The article 500 and/or machine-readable or computer-readable storage medium 502 may include one or more types of computer-readable storage media capable of storing data, including volatile memory or, non-volatile memory, removable or non-removable memory, erasable or non-erasable memory, writeable or re-writeable memory, and so forth. In some embodiments, the store medium 502 may comprise a non-transitory storage medium. Examples of a machine-readable storage medium may include, without limitation, random-access memory (RAM), dynamic RAM (DRAM), Double-Data-Rate DRAM (DDR-DRAM), synchronous DRAM (SDRAM), static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other type of computer-readable storage media suitable for storing information. Moreover, any media involved with downloading or transferring a computer program from a remote computer to a requesting computer carried by data signals embodied in a carrier wave or other propagation medium through a communication link (e.g., a modem, radio or network connection) is considered computer-readable storage media.

The article 500 and/or machine-readable medium 502 may store logic 504 comprising instructions, data, and/or code that, if executed by a machine, may cause the machine to perform a method and/or operations in accordance with the described embodiments. Such a machine may include, for example, any suitable processing platform, computing platform, computing device, processing device, computing system, processing system, computer, processor, or the like, and may be implemented using any suitable combination of hardware and/or software.

The logic 504 may comprise, or be implemented as, software, a software module, an application, a program, a subroutine, instructions, an instruction set, computing code, words, values, symbols or combination thereof. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context. When the logic 504 is implemented as software, any suitable processor and memory unit may execute the software.

Figure 6:
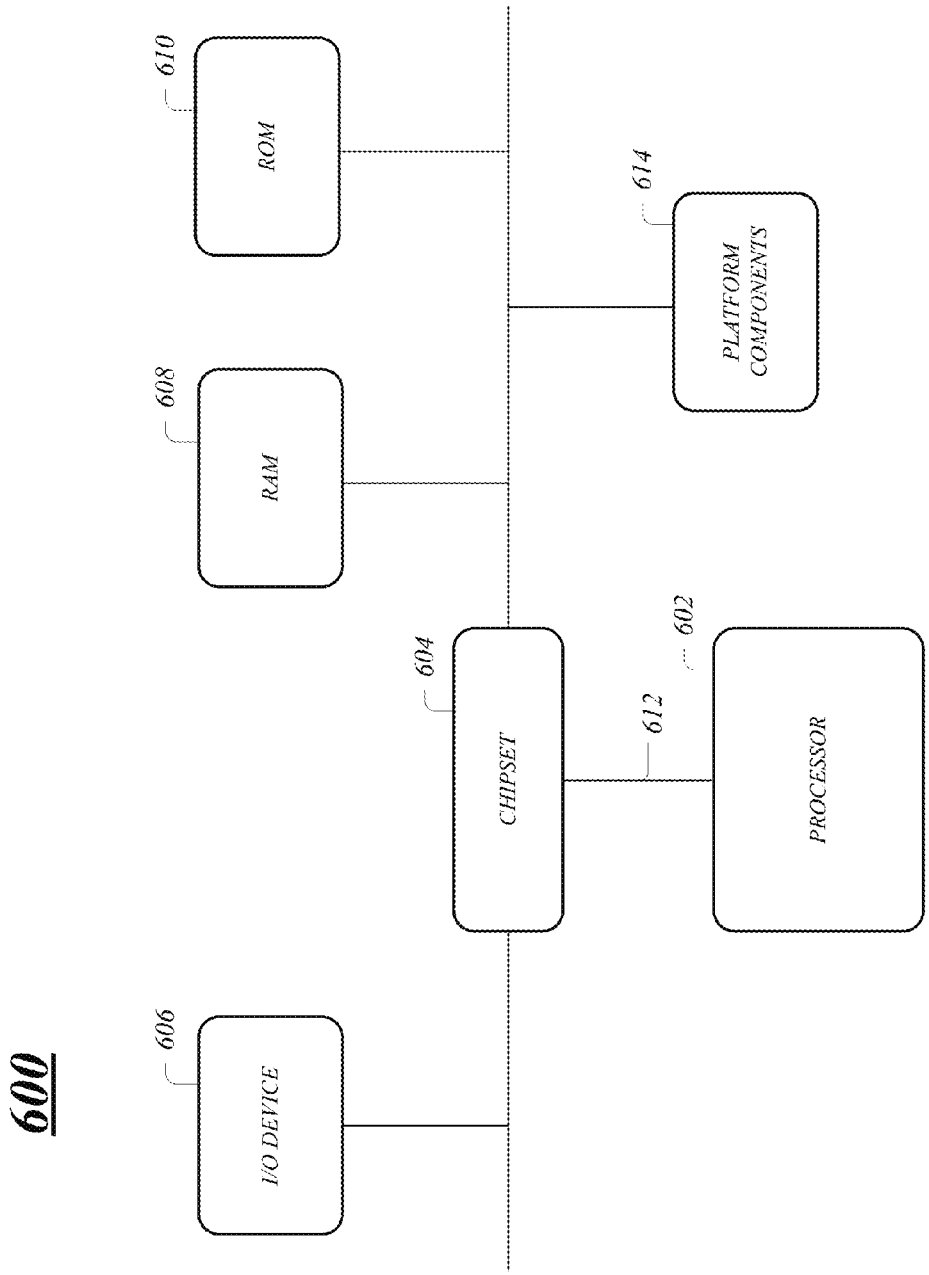
FIG. 6 illustrates one embodiment of a second apparatus.

FIG. 6 is a diagram of an exemplary system embodiment. In particular, FIG. 6 is a diagram showing a system 600, which may include various elements. For instance, FIG. 6 shows that system 600 may include a processor 602, a chipset 604, an input/output (I/O) device 606, a random access memory (RAM) (such as dynamic RAM (DRAM)) 608, and a read only memory (ROM) 610, and various platform components 614 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 6, I/O device 606, RAM 608, and ROM 610 are coupled to processor 602 by way of chipset 604. Chipset 604 may be coupled to processor 602 by a bus 612. Accordingly, bus 612 may include multiple lines.

Processor 602 may be a central processing unit comprising one or more processor cores and may include any number of processors having any number of processor cores. The processor 602 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 600 may include various interface circuits, such as an Ethernet interface and/or a Universal Serial Bus (USB) interface, and/or the like. In some exemplary embodiments, the I/O device 606 may comprise one or more input devices connected to interface circuits for entering data and commands into the system 600. For example, the input devices may include a keyboard, mouse, touch screen, track pad, track ball, isopoint, a voice recognition system, and/or the like. Similarly, the I/O device 606 may comprise one or more output devices connected to the interface circuits for outputting information to an operator. For example, the output devices may include one or more digital displays, printers, speakers, and/or other output devices, if desired. For example, one of the output devices may be a digital display. The display may be a cathode ray tube (CRTs), liquid crystal displays (LCDs), light emitting diode (LED) display or any other type of display.

The system 600 may also have a wired or wireless network interface to exchange data with other devices via a connection to a network. The network connection may be any type of network connection, such as a wireless connection or a wired connection, including but not limited to a cellular connection, radio frequency connection, an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

The foregoing represent are only a few examples of the problems that may be overcome by implementing a method and apparatus to manage MBS data in a wireless communications system, and it may be appreciated that other problems may be overcome and other advantages may exist as well.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It is also worthy to note that any reference to "one embodiment" or "an embodiment" means that a particular feature, structure, or characteristic described in connection with the embodiment is included in at least one embodiment. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:
1. A computer-implemented method, comprising:
receiving a broadcasted traffic priority message (TPM message) from a base station at a mobile station, the TPM message comprising traffic characteristic prioritization information identifying multiple best effort priority levels and identifying, for each of the multiple best effort priority levels, a respective maximum traffic burst size and maximum sustained traffic rate;
sending the traffic characteristic prioritization information to one or more applications;
receiving traffic characteristic parameters for a best effort service flow from the one or more applications;
sending a request from the mobile station to the base station to create or modify the best effort service flow; and
receiving a best effort priority level for the best effort service flow, the best effort priority level determined based on the traffic characteristic parameters for the best effort service flow and the traffic characteristic prioritization information.

2. The method of claim 1, comprising:
receiving scheduling information for the best effort service flow from the base station; and
transmitting the best effort service flow based on the scheduling information.

3. The method of claim 1, comprising:
sending a request from the mobile station to the base station to enable a downlink buffer report;

receiving a notification from the base station that the downlink buffer report is enabled;
receiving congestion information from the base station; and
sending the congestion information to the one or more applications.

4. The method of claim 1, wherein the one or more applications and the mobile station are collated on a same mobile device and are operative to communicate using one or more application programming interfaces (API).

5. The method of claim 1, wherein the mobile station and base station comprise separate mobile devices operative to communicate using a mobile air interface (MAI).

6. The method of claim 1, wherein the traffic characteristic parameters comprise one or more of a maximum traffic burst, a maximum sustained traffic rate or a delay.

7. The method of claim 1, wherein the traffic characteristic prioritization information comprises a ranking or prioritization of different types of wireless data.

8. The method of claim 7, wherein the different types of wireless data include one or more of voice data, video data or file transfer data.

9. The method of claim 8, wherein voice data is assigned a high priority, video data is assigned a medium priority and file transfer data is assigned a low priority.

10. An article comprising a non-transitory computer-readable storage medium containing instructions that when executed by a processor enable a system to:
receive a broadcasted traffic priority message (TPM) message comprising traffic characteristic prioritization information identifying multiple best effort priority levels and identifying, for each of the multiple best effort priority levels, a respective maximum traffic burst size and maximum sustained traffic rate;
send the traffic characteristic prioritization information to one or more applications;
receive traffic characteristic parameters for a best effort service flow from the one or more applications; and
send a request to create or modify the best effort service flow, wherein a best effort priority level for the best effort service flow is determined based on the traffic characteristic parameters for the best effort service flow and the traffic characteristic prioritization information.

11. The article of claim 10, comprising instructions that when executed enable the system to:
receive a prioritization value for the best effort service flow based on the traffic characteristic parameters and the traffic characteristic prioritization information;
receive scheduling information for the best effort service flow; and
transmit the best effort service flow based on the scheduling information.

12. The article of claim 10, comprising instructions that when executed enable the system to:
send a request to enable a downlink buffer report;
receive a notification that the downlink buffer report is enabled;
receive congestion information; and
send the congestion information to the one or more applications.

13. The article of claim 10, wherein the traffic characteristic parameters comprise one or more of a maximum traffic burst, a maximum sustained traffic rate or a delay.

14. The article of claim 10, wherein the traffic characteristic prioritization information comprises a ranking or prioritization of different types of wireless data including one or more of voice data, video data or file transfer data and wherein voice data is assigned a high priority, video data is assigned a medium priority and file transfer data is assigned a low priority.

15. A computer-implemented method, comprising:
sending a broadcasted traffic priority message (TPM message) from a base station to a mobile station, the TPM message comprising traffic characteristic prioritization information identifying multiple best effort priority levels and identifying, for each of the multiple best effort priority levels, a respective maximum traffic burst size and maximum sustained traffic rate;
receiving a request from the mobile station to create or modify a best effort service flow;
determining a best effort priority level for the best effort service flow, based on traffic characteristic parameters for the best effort service flow;
sending the best effort priority level for the best effort service flow from the base station to the mobile station.

16. The method of claim 15, comprising:
sending scheduling information for the best effort service flow from the base station to the mobile station; and
receiving a transmission of the best effort service flow from the mobile station based on the scheduling information.

17. The method of claim 15, comprising
receiving a request from the mobile station to enable a downlink buffer report;
sending a notification from the base station to the mobile station indicating that the downlink buffer report is enabled; and
sending congestion information from the base station to the mobile station.

18. The method of claim 15, wherein the traffic characteristic parameters comprise one or more of a maximum traffic burst, a maximum sustained traffic rate or a delay.

19. The method of claim 15, wherein the traffic characteristic prioritization information comprises a ranking or prioritization of different types of wireless data including one or more of voice data, video data or file transfer data and wherein voice data is assigned a high priority, video data is assigned a medium priority and file transfer data is assigned a low priority.

* * * * *